United States Patent
Iwama (10) Patent No.: US 9,329,466 B2
(45) Date of Patent: May 3, 2016

(54) IMAGE PROJECTION APPARATUS IN WHICH LAMP POWER IS DETERMINED BY MEASURED ILLUMINANCE

(71) Applicant: Kenichi Iwama, Kanagawa (JP)

(72) Inventor: Kenichi Iwama, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 205 days.

(21) Appl. No.: 14/100,342

(22) Filed: Dec. 9, 2013

(65) Prior Publication Data

US 2014/0184924 A1 Jul. 3, 2014

(30) Foreign Application Priority Data

Dec. 27, 2012 (JP) .................. 2012-286290

(51) Int. Cl.
| | | |
|---|---|---|
| G03B 21/14 | (2006.01) | |
| G03B 21/20 | (2006.01) | |
| H04N 1/407 | (2006.01) | |
| H04N 1/60 | (2006.01) | |
| G02B 26/00 | (2006.01) | |
| G02F 1/1335 | (2006.01) | |
| H04N 9/31 | (2006.01) | |
| H04N 5/74 | (2006.01) | |

(52) U.S. Cl.
CPC ............ *G03B 21/2053* (2013.01); *G02B 26/00* (2013.01); *G02F 1/133611* (2013.01); *H04N 1/407* (2013.01); *H04N 1/4078* (2013.01); *H04N 1/6027* (2013.01); *H04N 5/74* (2013.01); *H04N 9/3155* (2013.01); *H04N 9/3182* (2013.01); *H04N 9/3194* (2013.01)

(58) Field of Classification Search
CPC .............. G03B 21/2053; H04N 9/3155; H04N 9/3182; H04N 9/3194; H04N 1/407; H04N 1/4078; H04N 1/6027; G02B 26/00; G02F 1/133611

See application file for complete search history.

(56) References Cited

U.S. PATENT DOCUMENTS

| | | | |
|---|---|---|---|
| 2002/0050987 A1 | 5/2002 | Sakashita | |
| 2005/0219467 A1* | 10/2005 | Nomizo | G03B 21/26 353/30 |
| 2009/0295842 A1* | 12/2009 | Okada | G09G 3/3406 345/690 |
| 2013/0113812 A1 | 5/2013 | Iwama | |

FOREIGN PATENT DOCUMENTS

| | | |
|---|---|---|
| JP | 2000-131668 | 5/2000 |
| JP | 4819255 | 9/2011 |
| JP | 2013-101207 | 5/2013 |

\* cited by examiner

*Primary Examiner* — Sultan Chowdhury
*Assistant Examiner* — Magda Cruz
(74) *Attorney, Agent, or Firm* — Oblon, McClelland, Maier & Neustadt, L.L.P.

(57) ABSTRACT

An image projection apparatus includes: an illuminance sensor for measuring surrounding illuminance; an image data processing unit that increases a gradation value of the image data in accordance with brightness of the image data; a set information storage unit for storing at least two or more pieces of correspondence information for each range of the obtained illuminance, the information indicating correspondence between the brightness of the image data and power a light source that increases in accordance with the brightness; a total control unit for determining the lamp power by referring to a table indicating the correspondence information, based on the obtained brightness of the image and the illuminance; and a projection unit for projecting with the determined lamp power the image data, wherein in the correspondence information, a value of the lamp power is set lower as the illuminance becomes lower.

6 Claims, 7 Drawing Sheets

| ILLUMINANCE (lx) | TABLE |
|---|---|
| 600 OR MORE | #1 |
| 600 TO 300 | #2 |
| LESS THAN 300 | #3 |

FIG.3

(a)
TABLE #1

| BRIGHTNESS OF IMAGE | LAMP POWER |
|---|---|
| 100% | 240W |
| 80% TO 99% | 220W |
| 60% TO 79% | 200W |
| 40% TO 59% | 180W |
| 20% TO 39% | 160W |
| 0% TO 19% | 140W |

(b)
TABLE #2

| BRIGHTNESS OF IMAGE | LAMP POWER |
|---|---|
| 100% | 215W |
| 80% TO 99% | 200W |
| 60% TO 79% | 185W |
| 40% TO 59% | 170W |
| 20% TO 39% | 155W |
| 0% TO 19% | 140W |

(c)
TABLE #3

| BRIGHTNESS OF IMAGE | LAMP POWER |
|---|---|
| 100% | 190W |
| 80% TO 99% | 180W |
| 60% TO 79% | 170W |
| 40% TO 59% | 160W |
| 20% TO 39% | 150W |
| 0% TO 19% | 140W |

IMAGE PROJECTION APPARATUS IN WHICH LAMP POWER IS DETERMINED BY MEASURED ILLUMINANCE

CROSS-REFERENCE TO RELATED APPLICATIONS

The present application claims priority to and incorporates by reference the entire contents of Japanese Patent Application No. 2012-286290 filed in Japan on Dec. 27, 2012.

BACKGROUND OF THE INVENTION

1. Field of the Invention

The present invention relates to an image projection apparatus and a method of controlling the same.

2. Description of the Related Art

Conventionally, projectors are adapted to perform various processes in order to adjust the quality of an image to be projected. For example, a projector disclosed in Japanese Patent Application Laid-open No. 2002-156951 performs a process of changing the output of a lamp in accordance with the number of gradations of an input signal. More specifically, when a dark image is inputted into the projector, not only dark colors are displayed with image formation elements (such as liquid crystal devices and DMDs), but also a process of decreasing the output of the lamp is performed. By performing such processes, the number of gradations that can be expressed on a projection screen can be made into (the number of gradations that can be expressed with the image formation elements) multiplied by (a brightness range that can be expressed with the lamp).

A projector disclosed in Japanese Patent Application Laid-open No. 2000-131668 performs a process of changing the output of a lamp in accordance with the brightness of the room where the projector is used. For example, the lamp output is decreased in a dark room, whereas the lamp output is increased in a bright room. By performing such processes, a projection screen having appropriate brightness can be displayed.

However, in the aforementioned conventional technologies, the lamp output could be adjusted only in accordance with any one of two input values: a value indicating the brightness of the room where the projector is used; and a value indicating the number of gradations of an input signal. Accordingly, even when the lamp output was desired to be decreased in accordance with a dark image, the lamp output was sometimes increased according to a bright room. Thus, there were possibilities that the effects obtained by adjustment of the lamp were offset.

The present invention has been made in view of the above-described circumstances, and an object of the present invention is to provide an image projection apparatus that can appropriately adjust the output of a lamp in accordance with two input values: a value indicating the number of gradations of an inputted image; and a value indicating the illuminance of the room where the image projection apparatus is used.

SUMMARY OF THE INVENTION

It is an object of the present invention to at least partially solve the problems in the conventional technology.

According to the present invention, there is provided: an image projection apparatus, comprising: an external connection unit configured to receive an input of image data; an illuminance sensor configured to measure surrounding illuminance; an image data processing unit configured to increase a gradation value of the image data in accordance with brightness of the image data; a set information storage unit configured to store therein at least two or more pieces of correspondence information for each range of the obtained illuminance, the pieces of correspondence information indicating correspondence between the brightness of the image data and lamp power of a lamp serving as a light source, the lamp power increasing in accordance with the brightness; a total control unit configured to determine the lamp power of the lamp by referring to a table indicating the correspondence information stored in the set information storage unit, based on the obtained brightness of the image and the illuminance; and a projection unit configured to project with the determined lamp power the image data having the gradation value increased.

In the above-described image projection apparatus, in the correspondence information, a value of the lamp power is set lower as the illuminance becomes lower.

The present invention also provides a method for controlling an image projection apparatus, the image projection apparatus including an external connection unit configured to receive an input of image data, an illuminance sensor configured to measure surrounding illuminance, and a set information storage unit configured to store therein at least two or more pieces of correspondence information for each range of the obtained illuminance, the pieces of correspondence information indicating correspondence between the brightness of the image data and lamp power of a lamp serving as a light source, the lamp power increasing in accordance with the brightness, the method comprising: an image data processing step of obtaining brightness from the inputted image data and increasing a gradation value of the image data in accordance with the brightness of the image data; a total control step of determining the lamp power of the lamp by referring to the correspondence information stored in the set information storage unit, based on the obtained brightness of the image and the illuminance; and a projection step of projecting with the determined lamp power the image data having the gradation value increased.

In the above-described method for controlling an image projection apparatus, in the correspondence information, a value of the lamp power is set lower as the illuminance becomes lower.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
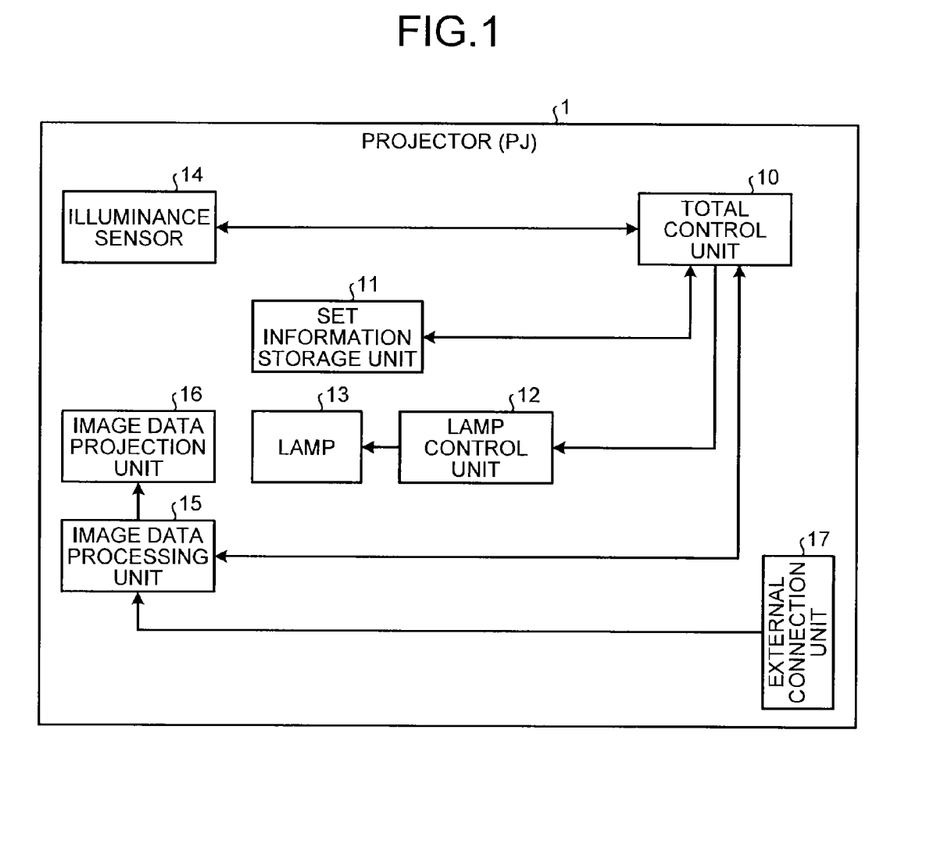
FIG. 1 is a block diagram illustrating a functional configuration of an image projection apparatus according to an embodiment.

Hereinbelow, an embodiment that embodies an image projection apparatus of the present invention will be described. FIG. 1 is a block diagram illustrating a functional configuration of a projector 1 that is an image projection apparatus. As illustrated in FIG. 1, the projector 1 includes a total control unit 10, a set information storage unit 11, a lamp control unit 12, a lamp 13 serving as a light source, an illuminance sensor 14, an image data processing unit 15, an image data projection unit 16, and an external connection unit 17. For example, the total control unit 10 is configured by hardware such as a CPU to control the entire apparatus. More specifically, the total control unit 10 also performs a process of determining a final lamp output based on the input values obtained from the illuminance sensor 14 and the image data processing unit 15.

Figure 2:
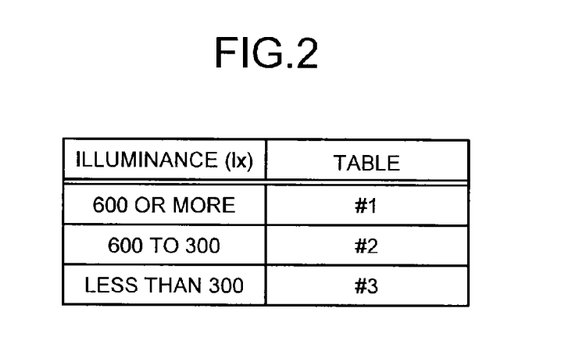
FIG. 2 a diagram illustrating one example of a relationship between obtained illuminance and tables to be used in the embodiment.
Figure 3:
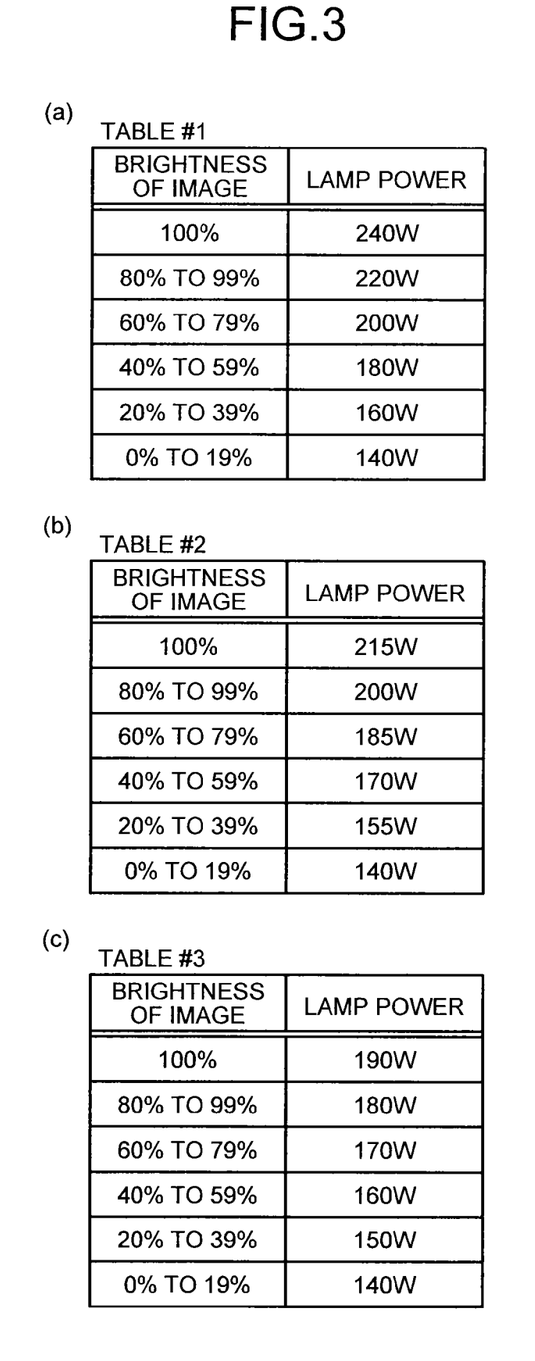
FIGS. 3(a) to 3(c) each of that is a diagram illustrating a relationship between brightness of image data and lamp power in each table in the embodiment.

The set information storage unit 11 stores tables for setting an upper limit of the lamp power in accordance with the illuminance of the room where the image projection apparatus is used. FIG. 2 illustrates a correspondence table to be used for determining which table to select for determining the lamp power based on the range of illuminance. FIGS. 3A to 3C illustrate correspondence tables each indicating correspondence between the brightness of an image and the lamp power. The correspondence tables correspond to the correspondence information. In the present embodiment, as illustrated in FIG. 2, if the range of the illuminance obtained by the illuminance sensor 14 is less than 300 lx, table #3 is selected. If the range of the illuminance obtained by the illuminance sensor 14 is 300 lx or more and less than 600 lx, table #2 is selected. If the range of the illuminance obtained by the illuminance sensor 14 is 600 lx or more, table #1 is selected.

In table #1, the lamp power is set to fall within the range of 140 W to 240 W in accordance with the brightness (gradation level) of an image. In table #2, the lamp power is set to fall within the range of 140 W to 215 W in accordance with the brightness (gradation level) of the image. In table #3, the lamp power is set to fall within the range of 140 W to 190 W in accordance with the brightness (gradation level) of the image. Namely, in the present embodiment, as the illuminance becomes higher, an upper limit of the lamp power and an output of the lamp power with respect to the brightness of an image are set to be larger.

Figure 6:
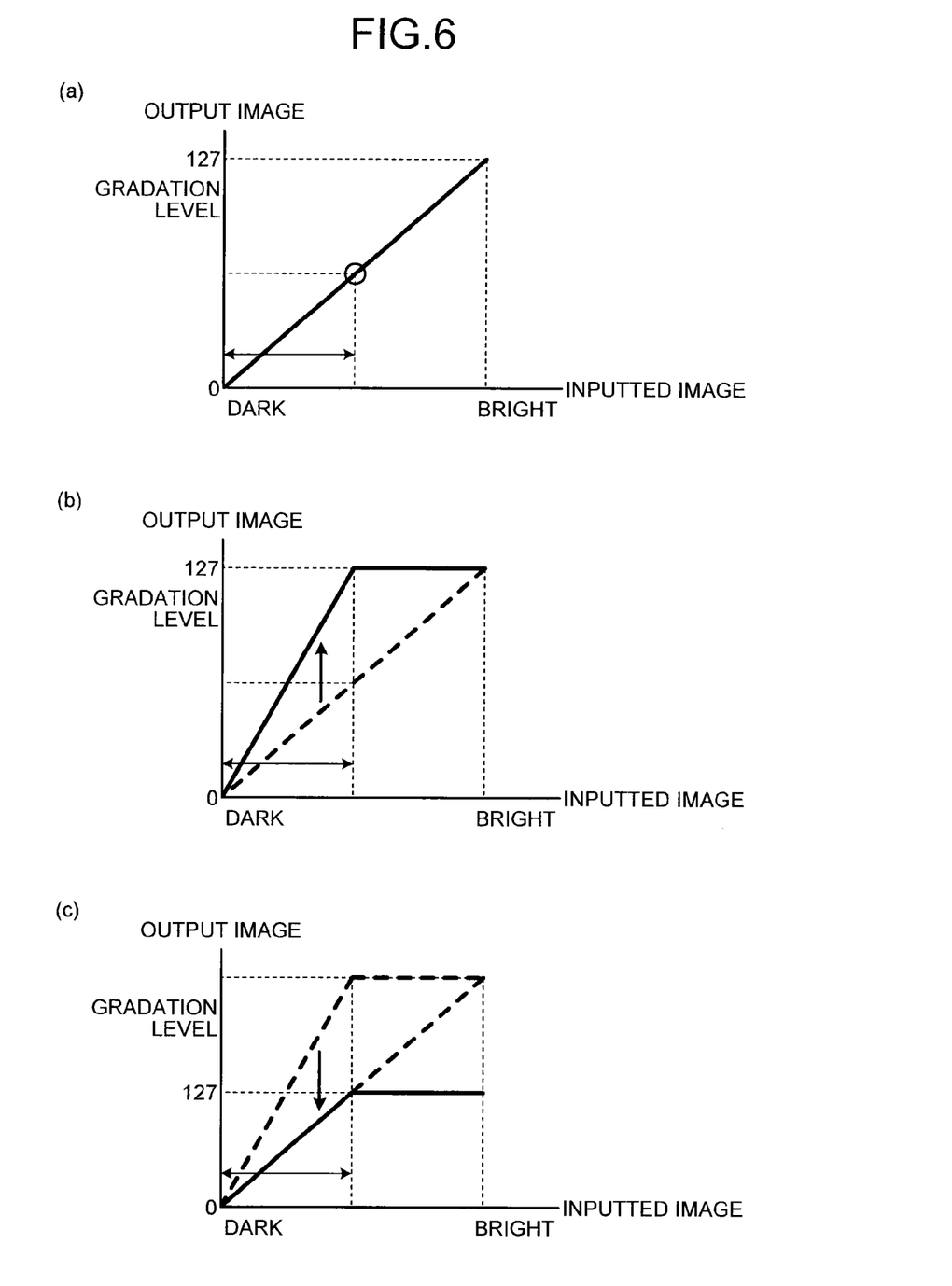
FIGS. 6(a) to 6(c) are explanatory views illustrating a process of electrically amplifying the brightness of inputted image data in the embodiment.

The lamp control unit 12 controls the lamp 13 in accordance with a value of the lamp power determined by the total control unit 10. The external connection unit 17 is connected with a PC, a DVD player and the like to receive image data and video data. The image data processing unit 15 sends, to the image data projection unit 16, the image data received from the external connection unit 17. The image data processing unit 15 also computes the brightness (gradation level) of the image data and executes a process of increasing the gradation level of the image data in accordance with the brightness of the image data. FIGS. 6(a) to 6(c) are explanatory views illustrating the detail of the process of increasing the gradation level of the image data in accordance with the brightness of the image data. In FIGS. 6(a) to 6(c), the abscissa represents the brightness of inputted image data, and the ordinate represents the brightness of image data to be outputted. The gradation level of 0 to 127 is used as a unit of the drawings.

As illustrated in FIG. 6(a), the brightness of inputted image data and the brightness of outputted image data are in proportion of 1:1 in a normal state. In FIG. 6(a), a range up to a circled point is the range of the brightness to be used in the inputted image data. In this case, as illustrated in FIG. 6(b), supposing that the maximum brightness that can be processed by the image data processing unit 15 is a 127-gradation level, the image data processing unit 15 increases the gradation level of the image data so as to match the most bright gradation level of the inputted image data with the 127-gradation level. For example, when the brightness of the brightest image is expressed as 100% and the brightness of inputted image data is 50%, image processing is performed to amplify the gradation level twofold. Then, as illustrated in FIG. 6(c), the lamp power is reduced for optical correction in proportion to the brightness increased by the image processing of the gradation level. As a result, an energy saving effect can be realized without changing the brightness of outputted image, that is, without changing the apparent brightness viewed by a user.

The image data projection unit 16 projects the image data received from the image data processing unit 15. The image data projection unit 16 does not project unprocessed image data, but projects, with the lamp power determined by the total control unit 10, the image data with the gradation value increased by the image data processing unit 15. The illuminance sensor 14 measures the illuminance and inputs a measured value into the total control unit 10.

Figure 4:
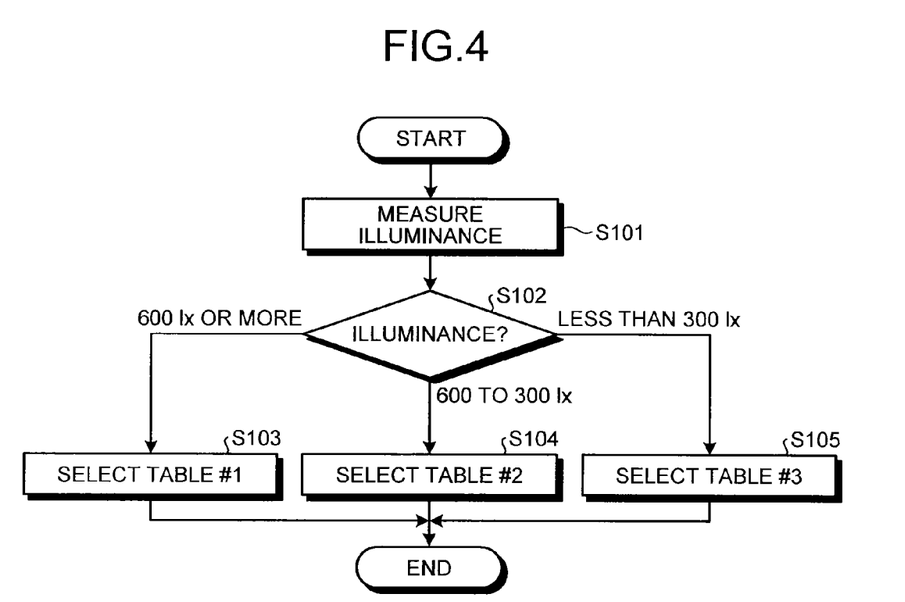
FIG. 4 is a flow chart illustrating the flow of a process of selecting a table in accordance with the illuminance in the embodiment.

Operation of the present embodiment is now described with reference to the flow charts of FIGS. 4 and 5. FIG. 4 is a flow chart illustrating the operation of selecting a table based on the illuminance value measured with the illuminance sensor 14. As illustrated in FIG. 4, the total control unit 10 obtains the illuminance measured by the illuminance sensor 14 (Step S101). The total control unit 10 then selects a table corresponding to the current illuminance by referring to a table stored in the set information storage unit 11 illustrated in FIG. 2 (step S102). More specifically, if the illuminance is 600 lx or more, the table #1 is selected (step S103). If the illuminance is 300 lx or more and less than 600 lx, the table #2 is selected (step S104). If the illuminance is less than 300 lx, the table #3 is selected (step S105). The above-stated operation is executed in a periodic basis, that is, every other second for example, and a table corresponding to the surrounding brightness of the projector 1 is selected at each of that moment.

Figure 5:
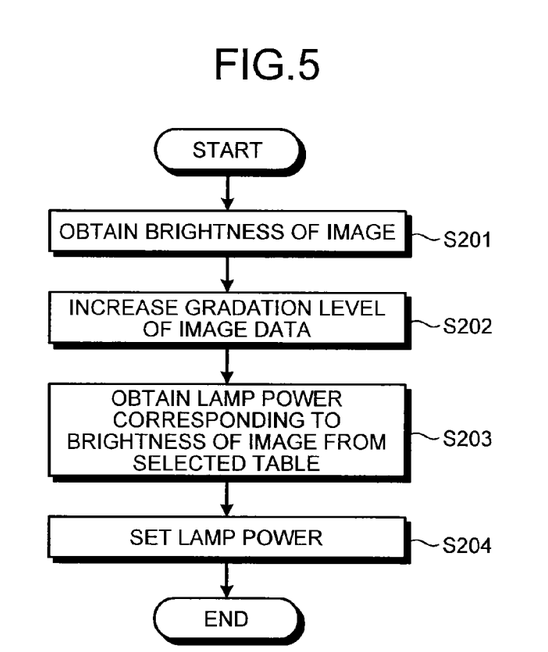
FIG. 5 is a flow chart illustrating the flow of a process of determining the lamp power in the embodiment.

Next, FIG. 5 is a flow chart illustrating the flow of the process of determining the lamp power from the brightness of inputted image data. As illustrated in FIG. 5, first, the total control unit 10 obtains the brightness of an image from the image data processing unit 15 (step S201). Next, the image data processing unit 15 performs, on the image data, the process of increasing the gradation level of the image data based on the brightness of the image (step S202). Next, the total control unit 10 obtains lamp power corresponding to the brightness of the image from the selected table (step S203). The total control unit 10 then sets the obtained lamp power for the lamp control unit 12 (Step S204). A series of these processes are executed, for example, in each frame of the image data, so that the lamp power to be set corresponds to the brightness of the image data at the time of each frame.

According to the projector 1 of the present embodiment described above, an output range of the lamp power, which is determined in accordance with the brightness of image data, is determined in accordance with the illuminance obtained by the illuminance sensor 14. In other words, when the illuminance is high, an upper limit of the lamp power range is set higher and a lamp power value corresponding to the brightness of each image data is also set to be high. On the contrary, when the illuminance is low, the upper limit of the lamp power range is set lower and a lamp power value corresponding to the brightness of each image data is also set to be low. Thus, the final lamp power is determined based on two input values, an input value indicating the illuminance and an input value indicating the brightness (gradation level) of image data. As a result, the lamp power is set as an appropriate value corresponding to each of the input values.

Although the table to be used is determined based on the illuminance range in the above-described embodiment, the illuminance range may suitably be changed in accordance with features of the projector 1. Further, it is not needed to prepare three tables based on the illuminance, but at least two or more tables may be prepared as options for selection. Moreover, the correspondence between the brightness of image data and the light power may suitably be changed.

Figure 7A:
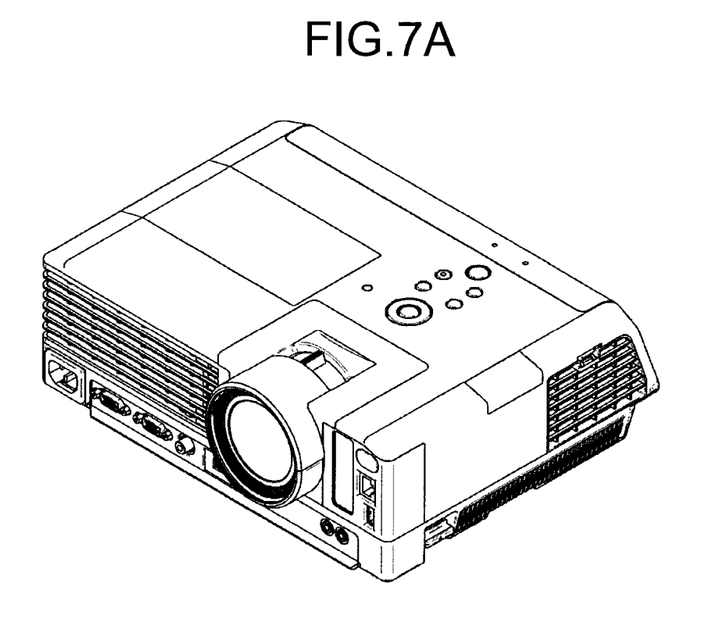
FIG. 7A is a perspective view of an image projection apparatus, as viewed from the front side, including an information processor embodied according to each embodiment.
Figure 7B:
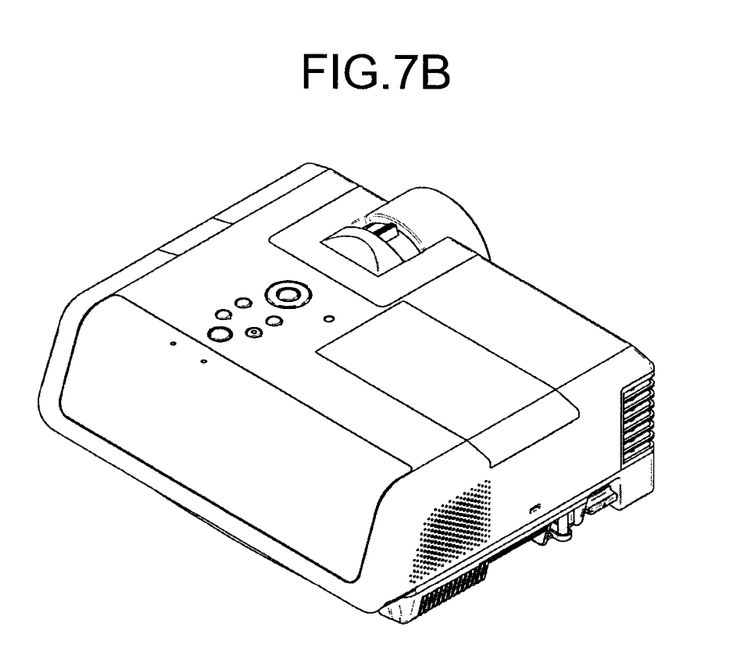
FIG. 7B is a perspective view of the image projection apparatus, as viewed from the rear side, including the information processor embodied according to each embodiment.
Figure 7C:
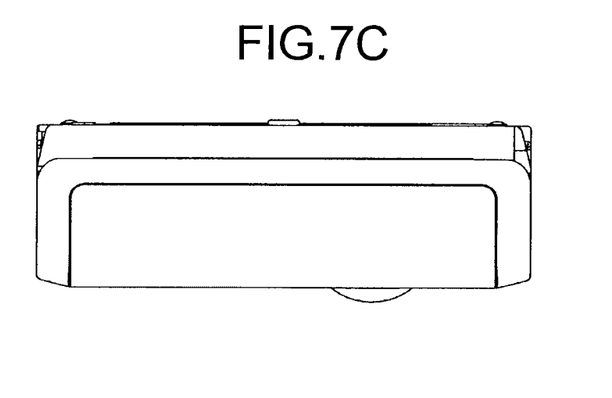
FIG. 7C is a rear view of the image projection apparatus including the information processor embodied according to each embodiment.
Figure 7D:
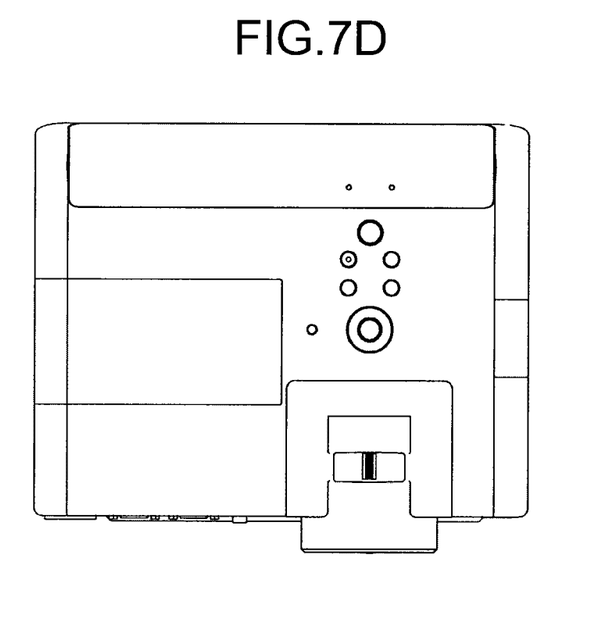
FIG. 7D is a top view of the image projection apparatus including the information processor embodied according to each embodiment.
Figure 7E:
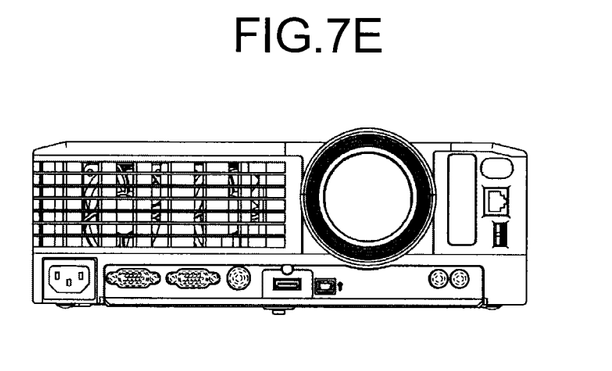
FIG. 7E is a front view of the image projection apparatus including the information processor embodied according to each embodiment.
Figure 7F:
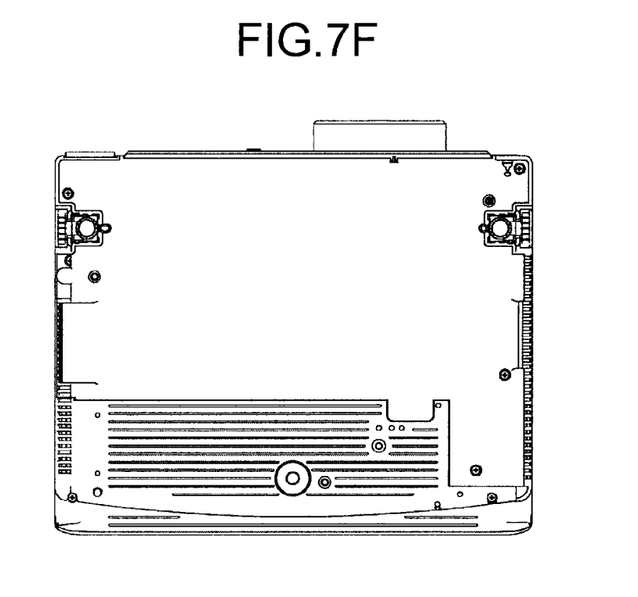
FIG. 7F is a bottom view of the image projection apparatus including the information processor embodied according to each embodiment.
Figure 7G:
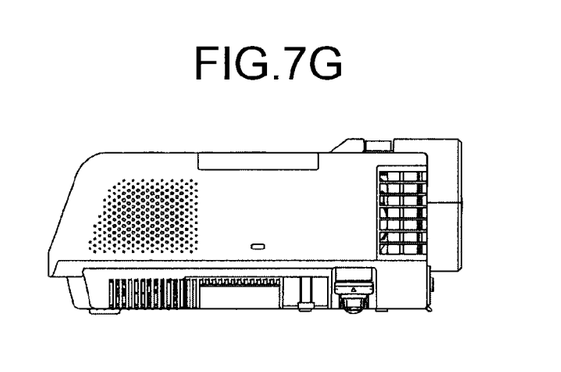
FIG. 7G is a side view of the image projection apparatus including the information processor embodied according to the embodiment.
Figure 7H:
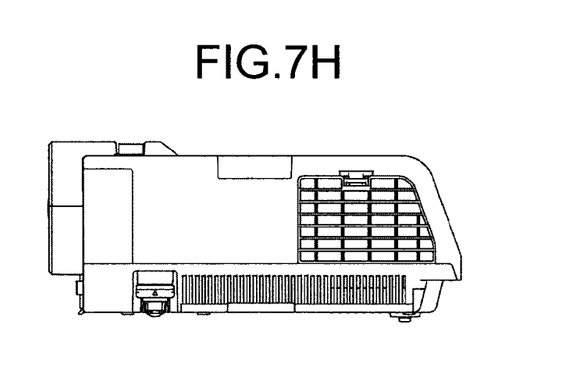
FIG. 7H is a side view of the image projection apparatus including the information processor embodied according to each embodiment.

FIGS. 7A to 7G illustrate one example of the shape of the projector 1. FIG. 7A is a perspective view of an image projection apparatus as viewed from the front side. FIG. 7A is a perspective view of the image projection apparatus as viewed from the rear side. FIG. 7C is a rear view of the image projection apparatus. FIG. 7D is a top view of the image projection apparatus. FIG. 7E is a front view of the image projection apparatus. FIG. 7F is a bottom view of the image projection apparatus. FIG. 7G is a side view of the image projection apparatus. FIG. 7H is a side view of the image projection apparatus.

The present invention provides the advantage that the output of a lamp can appropriately be adjusted with respect to two input values: a value indicating the number of gradations of an inputted image and a value indicating the illuminance of the room where the image projection apparatus is used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus, comprising:
an external connection interface configured to receive an input of image data;
an illuminance sensor configured to measure surrounding illuminance;
an image data processing circuit configured to increase a gradation value of the image data in accordance with a brightness of the input image data;
a set information memory configured to store therein correspondence information for each range of the measured illuminance, the correspondence information indicating correspondence between the brightness of the image data and lamp power of a lamp serving as a light source, the lamp power increasing in accordance with the brightness;
a total control processing circuit configured to determine the lamp power of the lamp by referring to a table indicating the correspondence information stored in the set information memory, based on the brightness of the input image data and the measured illuminance; and
a projector configured to project, with the determined lamp power, the image data having the gradation value increased, wherein
in the correspondence information used by the total control processing circuit, a rate of increase of the lamp power, as the brightness of the image data increases, is set lower as the measured illuminance becomes lower.

2. The image projection apparatus according to claim 1, wherein
the total control processing circuit obtains the illuminance measured by the illuminance sensor at each of specified times, and determines the correspondence information to be used for determining the lamp power, based on the illuminance obtained for determining the lamp power.

3. The image projection apparatus according to claim 1, wherein
the total control processing circuit determines the lamp power based on the brightness in every frame of the inputted image data.

4. A method for controlling an image projection apparatus, the image projection apparatus including an external connection interface configured to receive an input of image data, an illuminance sensor configured to measure surrounding illuminance, and a set information memory configured to store therein correspondence information for each range of the measured illuminance, the correspondence information indicating correspondence between the brightness of the image data and lamp power of a lamp serving as a light source, the lamp power increasing in accordance with the brightness, the method comprising:
obtaining brightness from the inputted image data and increasing a gradation value of the image data in accordance with the brightness of the image data;
determining the lamp power of the lamp by referring to the correspondence information stored in the set information memory, based on the obtained brightness of the image and the measured illuminance; and
projecting, with the determined lamp power, the image data having the gradation value increased, wherein
in the correspondence information used to determine the lamp power, a rate of increase of the lamp power, as the brightness of the image data increases, is set lower as the measured illuminance becomes lower.

5. The method of claim 4, further comprising:
obtaining the illuminance measured by the illuminance sensor at each of specified times; and
determining the correspondence information to be used for determining the lamp power, based on the illuminance obtained for determining the lamp power.

6. The method of claim 4, further comprising:
determining the lamp power based on the brightness in every frame of the inputted image data.

* * * * *